US005745102A

United States Patent [19]
Bloch et al.

[11] Patent Number: 5,745,102
[45] Date of Patent: Apr. 28, 1998

[54] ELECTRO-OPTICAL DISPLAY FOR A DIGITAL DATA STORAGE DEVICE

[76] Inventors: Harry S. Bloch, 871 Greenridge Cir., Langhorne, Pa. 19053; Nathan Bloch, 16 N. Green Acre Dr., Cherry Hill, N.J. 08003

[21] Appl. No.: 819,445

[22] Filed: Mar. 17, 1997

Related U.S. Application Data

[63] Continuation of Ser. No. 428,901, Apr. 25, 1995, abandoned.

[51] Int. Cl.⁶ .................................................. G09G 5/00
[52] U.S. Cl. .......................... 345/185; 345/50; 360/131
[58] Field of Search ................................ 345/1, 185, 50; 361/684; 360/133, 131, 134, 135; 235/380–382, 382.5, 493; 348/231–233, 220

[56] References Cited

U.S. PATENT DOCUMENTS

| | | | |
|---|---|---|---|
| 4,385,366 | 5/1983 | Housey, Jr. | 345/185 |
| 4,511,994 | 4/1985 | Saito | 360/133 |
| 4,518,657 | 5/1985 | Yanagida . | |
| 4,633,356 | 12/1986 | Takahashi . | |
| 4,689,705 | 8/1987 | Oishi et al. . | |
| 4,719,338 | 1/1988 | Avery et al. | 235/380 |
| 4,774,618 | 9/1988 | Raviv . | |
| 4,788,658 | 11/1988 | Hanebuth | 361/684 |
| 4,800,458 | 1/1989 | Okita . | |
| 4,839,760 | 6/1989 | Yamada et al. . | |
| 5,011,016 | 4/1991 | Ozeki . | |
| 5,020,926 | 6/1991 | Wilhelm . | |
| 5,068,787 | 11/1991 | Pipella et al. | 364/406 |
| 5,164,239 | 11/1992 | Ozawa et al. . | |
| 5,210,671 | 5/1993 | Blackston . | |
| 5,210,672 | 5/1993 | Ivers et al. . | |
| 5,264,975 | 11/1993 | Bajorek et al. . | |
| 5,276,311 | 1/1994 | Hennige | 235/380 |
| 5,359,183 | 10/1994 | Skodlar | 235/493 |

OTHER PUBLICATIONS

Wolverton, Van, "Running MS–DOS", Redmond Washington, Microsoft Press 1989.
Edwards, Scott, "Micro Messenger", *Electronics Hobbyists Handbook*, pp. 32–37 (Spring 1995).

*Primary Examiner*—Kee M. Tung
*Attorney, Agent, or Firm*—Ratner & Prestia

[57] ABSTRACT

An apparatus for displaying filename information on a floppy disk is disclosed. The apparatus utilizes a modified floppy disk housing and a modified floppy disk drive to automatically label the floppy disk with the filenames being copied to or deleted from the disk. The modified floppy disk housing includes an apparatus for visually displaying information indicative of the data stored on the floppy disk when the floppy disk is not inserted in a floppy disk drive. The apparatus on the floppy disk has a receiving device, adapted to reside on the floppy disk, for receiving digital data representing information indicative of the data stored on the floppy disk, a logic/memory device, adapted to reside on the floppy disk and coupled to the receiving device, for processing and storing the received digital data, and an LCD display, adapted to reside on the floppy disk and coupled to the logic/memory device, for receiving and displaying the digital signal representing the processed digital data such that information indicative of the data stored on the floppy disk can be viewed when the floppy disk is not inserted in a disk drive.

21 Claims, 16 Drawing Sheets

ELECTRO-OPTICAL DISPLAY FOR A DIGITAL DATA STORAGE DEVICE

This application is a continuation of application Ser. No. 08/428,901, filed May 25, 1995, now abandoned.

FIELD OF THE INVENTION

The present invention generally relates to data storage media and, more particularly, it relates to viewing/accessing filenames of data stored on a particular data storage media.

BACKGROUND OF THE INVENTION

Data used with software programs executing on personal computers is typically stored as files on devices such floppy disks, CD-ROMS, etc. Demand by the computing public for higher density storage devices is incessant and, currently, 3.5", high-density floppy disks can store up to 2.9 Megabytes of data with no end in sight.

With such a large storage capacity, floppy disks and other storage media may be accessed routinely for adding/deleting data to/from the storage media as desired. Several problems exist, however, with using conventional storage devices to store files of data. For example, one problem associated with storing information on storage media such as floppy disks is trying to identify, organize and track what files have been stored on which floppy disks.

In a conventional arrangement, computers contain software that is used to copy or delete files from the floppy disk. When copying a file to a floppy disk, the name and the contents of the file are copied to the magnetic media contained in the disk housing. Generally, the name of the file is copied to one location reserved for directory information and the contents are copied to another location reserved for file data. Conventional viewing of the name of a file is achieved by first inserting the floppy disk into the floppy disk drive, accessing that drive by typing in the correct code and then issuing a directory command. As the numbers of disks in a home or office grow, examining every disk by inserting it into the computer and executing a directory command is not practical. Since most floppy disks look identical, the need to label floppy disks is painfully evident.

Currently, the most commonly used method of labeling a floppy disk is to write the filenames on adhesive backed labels that are applied directly onto the floppy disk housing. This method, however, has several shortcomings.

For instance, it is left to the diligence of a user to consistently update these labels. Moreover, there is only a limited amount of space on conventional labels for writing filenames. And, in some cases, misspelling a filename on the label could cause the user difficulty when trying to load that file from the disk to the computer. Furthermore, if disks are updated often, it soon becomes necessary to peel and replace the adhesive backed labels. Quite often these labels just become outdated and illegible.

Accordingly, it is desirable to overcome the above listed shortcomings of conventional labels, for example, by eliminating the need to rely on a user's diligence to consistently label storage media and to avoid the inevitable inconveniences caused by filename misspellings or worn out labels.

SUMMARY OF THE INVENTION

The present invention involves an apparatus and method for visually displaying information indicative of the data stored on a data storage device when the data storage device is not inserted in a data reader device. The invention includes a receiving device, adapted to reside on the data storage device, for receiving data representing information indicative of the data stored on the data storage device; memory device, adapted to reside on the data storage means and coupled to the receiving means, for storing and decoding the received digital data and for providing a digital signal representing the decoded digital data; and a display device, adapted to reside on the data storage device and coupled to the memory device, for receiving and displaying the digital signal representing the decoded digital data such that information indicative of the data stored on the storage device can be viewed when the storage device is not inserted in the data reader device.

BRIEF DESCRIPTION OF THE DRAWINGS

The invention is best understood from the following detailed description when read in connection with the accompanying drawing, in which:

FIG. 6B shows a flowchart diagram of exemplary steps executed by the LCD BIOS shown in FIGS. 7A and 9B.

DETAILED DESCRIPTION OF THE PREFERRED EMBODIMENTS

Overview

The present invention, in overcoming the shortcomings of conventional storage device labelling described herein, essentially builds the responsibility of labelling the storage media into the computer in order to relieve the user of the responsibility. And, by using a programmable, dynamic display device, which is located directly on the storage device housing and which is updated transparent to the user, the inconveniences of misspellings and old labels are obviated.

In general, the present invention takes advantage of information which is already generated within a computer when accessing data on a data storage device (e.g., reads from and/or writes to a particular portion of the storage device reserved for directory information). This information is monitored and processed, for example by custom or semi-custom hardware/software, and transferred, via a data transfer interface, to a programmable, dynamic display device adapted to reside on the housing of the storage device.

More particularly, an exemplary embodiment of the present invention utilizes a specially-designed floppy disk housing along with additional circuitry added to the personal computer which accesses the floppy disk (e.g., a modified floppy disk drive) to automatically update a programmable, dynamic display means operatively and conveniently located on the floppy disk housing such that it stores and can display a current list of selected filenames stored on the storage device. This automatic labelling aspect of the present invention essentially involves storing the names of predetermined files (e.g., possibly only *.doc or *.exe files) or other labelling information (e.g., disk volume labels) in a memory which then drives, for example, a liquid crystal device (LCD) display secured to the floppy disk housing. Exemplary details of the present invention are provided below.

While the invention is described, for the most part, in terms of a floppy disk and floppy disk drive in a Microsoft™ Disk Operating System (MS-DOS) environment, it is understood that it is more generally applicable to other types of storage devices such as tape cartridges, magneto-optical disks and the like and for use on other types of systems such as Apple Macintosh™, NextStep™, OS/2™ or on Unix™-based platforms.

Description of Exemplary Embodiments

Figure 1B:
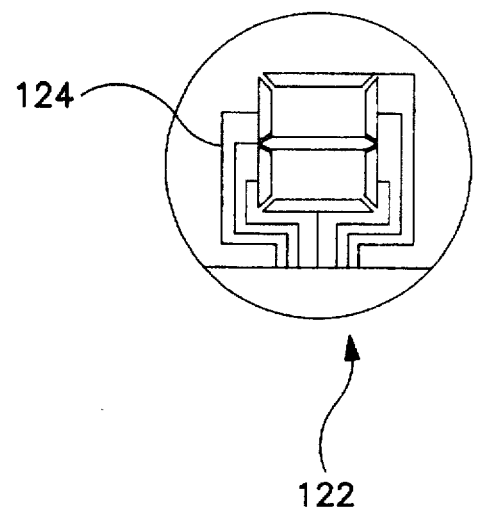
FIG. 1 illustrates an exemplary embodiment of a floppy disk modified in accordance with the present invention.
Figure 1A:
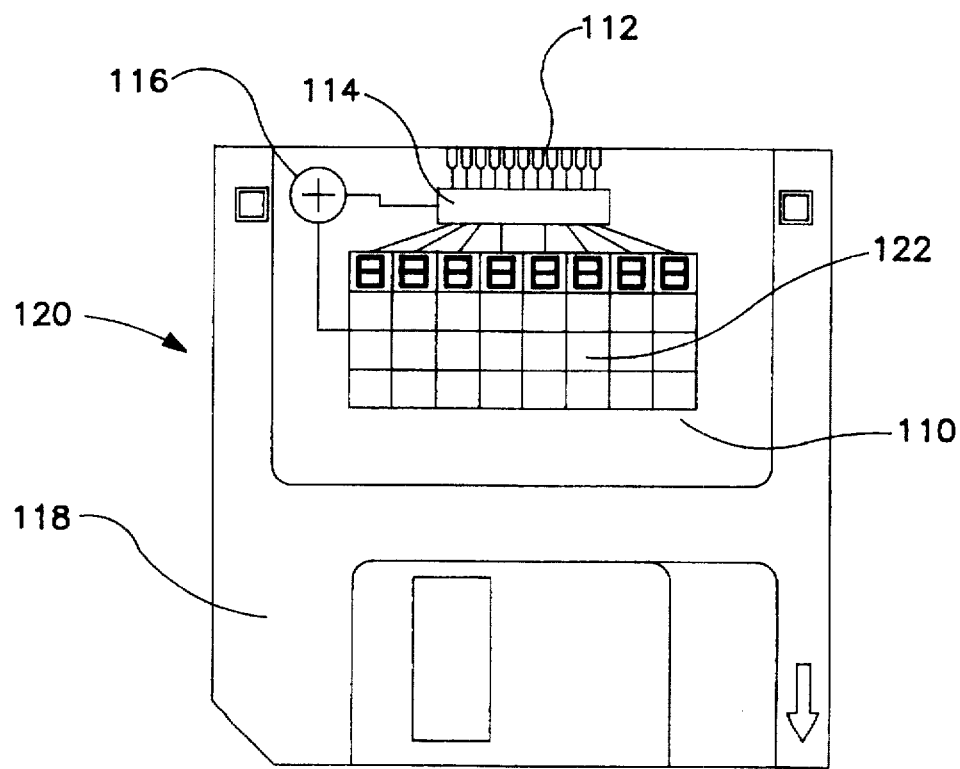

FIG. 1 illustrates an exemplary embodiment of a floppy disk modified in accordance with the present invention. As shown in FIG. 1, the exemplary embodiment of one aspect of the present invention includes a liquid crystal device (LCD) display 110, a disk terminal strip 112, a memory (including addressing and optionally processing circuitry) 114 and a battery 116 residing directly on the housing 118 of a floppy disk 120. In operation, memory 114 includes sufficient memory, e.g. RAM or PROM, to store the names of a predetermined number of files, e.g., 4 filenames (one per LCD row) limited to 8 alphanumeric characters each. As will be appreciated by those skilled in the art, additional LCD displays could be added for longer filenames, to provide for the display of filename extensions, etc. In addition, the battery 116 could be augmented with a photo-voltaic cell (not shown) which, for example, may provide power for the LCD displays.

The data contained in this memory is applied, via appropriate connection circuitry (e.g., optionally including individual registers assigned to each LCD element), to the LCD display 110 such that the names of the files contained on the disk are displayed on the LCD display 110.

The appropriate connection circuitry employed to deliver the digital representation of the filenames to the display means, as will be appreciated by those skilled in the art, may be implemented in several ways. One way is to dedicate an individual 8-bit register to each LCD in an array such that each register stores the digital representation of the alphanumeric character to be displayed on the LCD. In this implementation, the respective registers are directly coupled to their respective LCD drivers. Another possible implementation is to combine some predetermined number of memory devices with a predetermined number of registers to conveniently drive the appropriate LCDs. Each implementation, however, uses a separate addressing scheme for delivering the data representing the filenames across the data interface into its appropriate memory location. This stored data is then applied from its respective memory location to the input terminals of the LCD. Additional details of a preferred implementation are described below with reference to FIG. 4.

It should be noted that, although the embodiment of FIG. 1 shows the various elements including memory 114 and battery 116 residing external to the storage device housing for convenient adaptation to post-manufacture storage devices, these same elements could also reside internal to the storage device housing. That is, specially designed storage devices could include the memory 114 and power source 116 internal to the storage device housing leaving only the display means 110 and possibly the data interface (e.g., disk terminal strip 112) external to the data storage device. Moreover, as can be appreciated by those skilled in the art, a goal of the present invention is to minimize the amount of electronic s added to the storage device for reasons such as cost and complexity.

FIG. 1 also shows an expanded view of one of the plurality of LCDs 122 to illustrate how each branch of the LCD 122 is driven by a separate connection 124. Although the exemplary LCDs are shown as seven segment devices, it is contemplated that other types of LCD devices, for example 12 segment or 5×7 dot matrix elements, may be used according to the various factors including cost, memory limitations, connection limitations, application requirements, etc. As will be appreciated by those skilled in the art, the type of element (e.g., 7 segment LCD versus 5×7 dot matrix elements) may impact the design of memory 114.

Figure 2A:
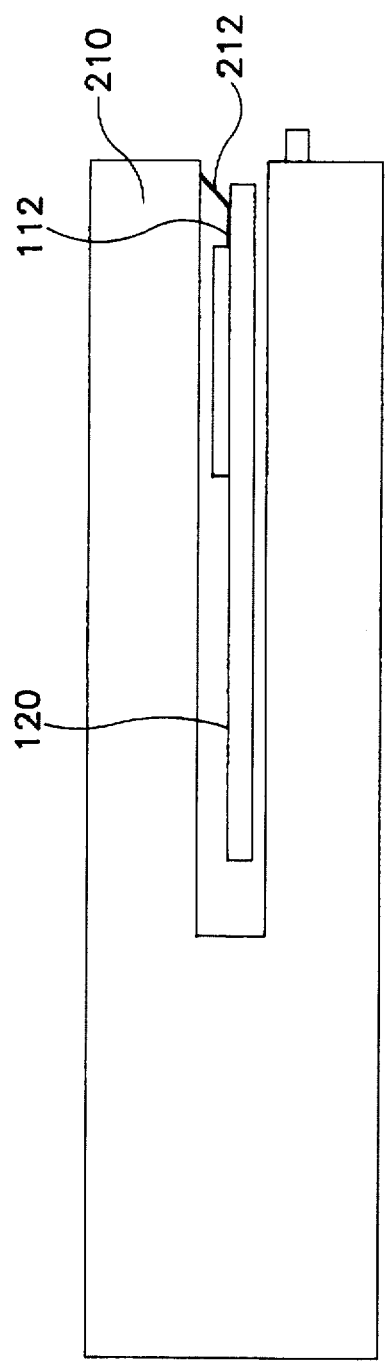
FIGS. 2A and 2B illustrate, respectively, a cross-sectional side view and front view of a floppy disk drive modified in accordance with another aspect of the present invention.
Figure 2B:
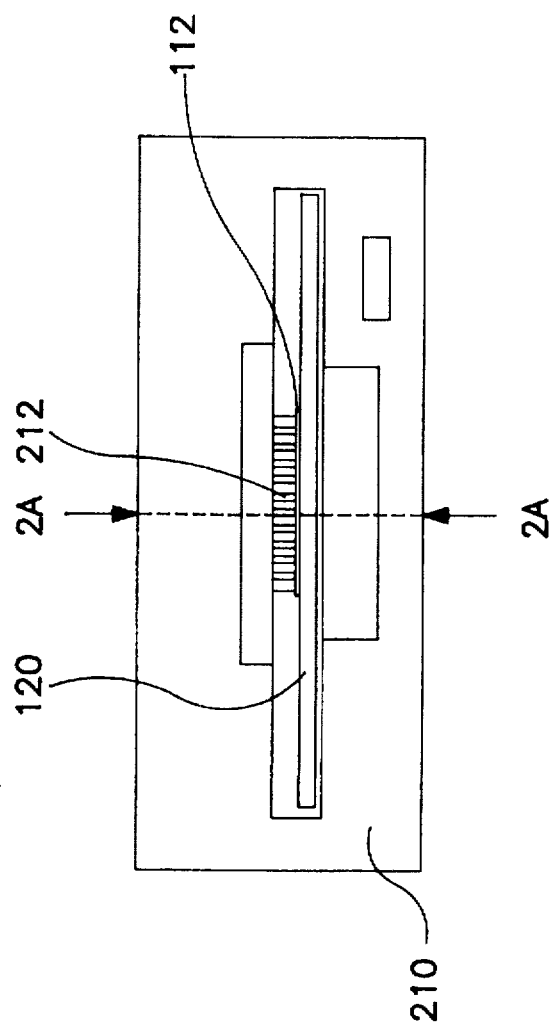

FIGS. 2A and 2B illustrate, respectively, a cross-sectional side view and front view of a floppy disk drive modified in accordance with another aspect of the present invention. FIG. 2A is a cross-sectional view taken along line 2A—2A in FIG. 2B. As shown in FIGS. 2A and 2B, the exemplary embodiment of this aspect of the present invention includes a modified floppy disk drive 210, having a drive terminal strip 212 contained in the floppy drive 210. When the floppy disk 120 is fully inserted into the floppy disk drive 210, the drive terminal strip 212 makes contact with the disk terminal strip 112 on the floppy disk 120. The drive terminal strip 212 provides a means for connecting with the memory 114, via the disk terminal strip 112, on disk 120 to add/delete filenames to/from the actual memory contained within means 114. In operation, when the data storage device 120 is inserted into the disk drive 210, terminal strips 112 and 212 complete a physical connection.

For the physical contact embodiment of drive terminal strip 212, the contacts are urged in the forward direction to ensure contact with the disk terminal strip 112 when inserted. The urging of the contacts forward can be achieved by techniques well known in the art such as designing a bias into a bend in the metal contacts or possibly providing support springs behind the contacts which force the contacts forward and minimize stresses on the metal contacts.

In addition to drive terminal strip 212, floppy disk drive 210 may be additionally modified to provide the appropriate electrical signals (i.e., digital data representing the filenames) to drive terminal strip 212 in order to add or delete a filename from the memory 114. Details of these additional modifications are described below in detail.

Continuing with FIGS. 2A and 2B, the disk drive 210, although modified to make contact with disk terminal strip 112 and interact with the LCD display 110 that is secured to the floppy disk 120 as described above, is also be fully compatible and functional with standard floppy disks. That is, the drive terminal strip 212 does not interfere with the operation of a conventional floppy disk which is not modified to operate in conjunction with present invention. This is so because the electrical signals produced at drive terminal strip 212 do not penetrate a conventional housing or otherwise interfere with normal operation between the floppy drive and the floppy disk. Additionally, an optional feature of the present invention could be to disable the generation of electrical signals at drive terminal strip 212 by the user via a software interface. This allows a user to use modified floppy disks as described herein or to use conventional floppy disks that they currently possess in a disk drive which has been modified in accordance with the present invention.

Figure 3A:
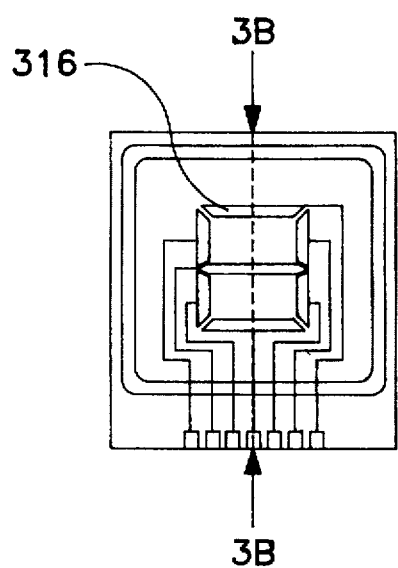
FIGS. 3A and 3B illustrate, respectively, a top plan view and side view of a conventional liquid crystal display element suitable for use with the modified disk shown in FIG. 1.
Figure 3B:
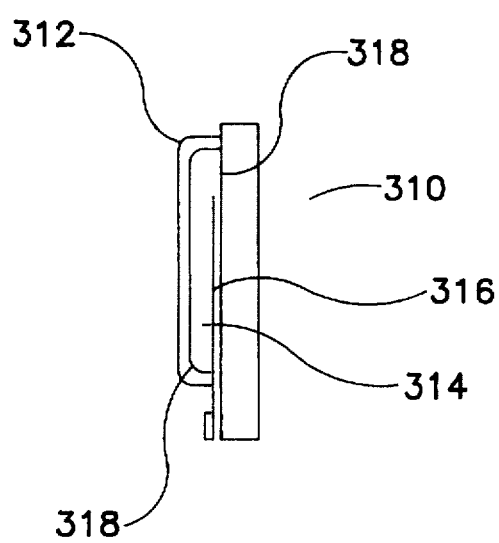

FIGS. 3A and 3B illustrate, respectively, a top plan view and side view of a conventional liquid crystal display element suitable for use with the modified disk shown in FIG. 1. FIG. 3B is a cross-sectional view taken along line 3B—3B in FIG. 3A. FIGS. 3A and 3B show a typical seven segment liquid crystal device. The device includes a base 310 and transparent cover 312 with the liquid crystal material 314 filling the space between. Very thin electrodes 316 are deposited on a transparent material such as tin oxide 318 on the inner surface of both the base 310 and the cover 312. The electrodes 316 are shaped to give the desired segment shapes. All numbers and most letters can be displayed on this matrix, however, if desired a twelve-segment display or a five by seven array can be used to generate all numbers and all letters. A wide variety of flat panel displays can be made with liquid crystal display technology. Large liquid crystal displays capable of 640×200 pixels and beyond have also been developed. These displays can show 25 lines by 80 characters. Due to their low voltage and power requirements, liquid crystal displays are widely specified as alphanumeric displays in battery powered watches, clocks, pocket calculators, digital multimeters, games, toys and other consumer products.

Figure 4A:
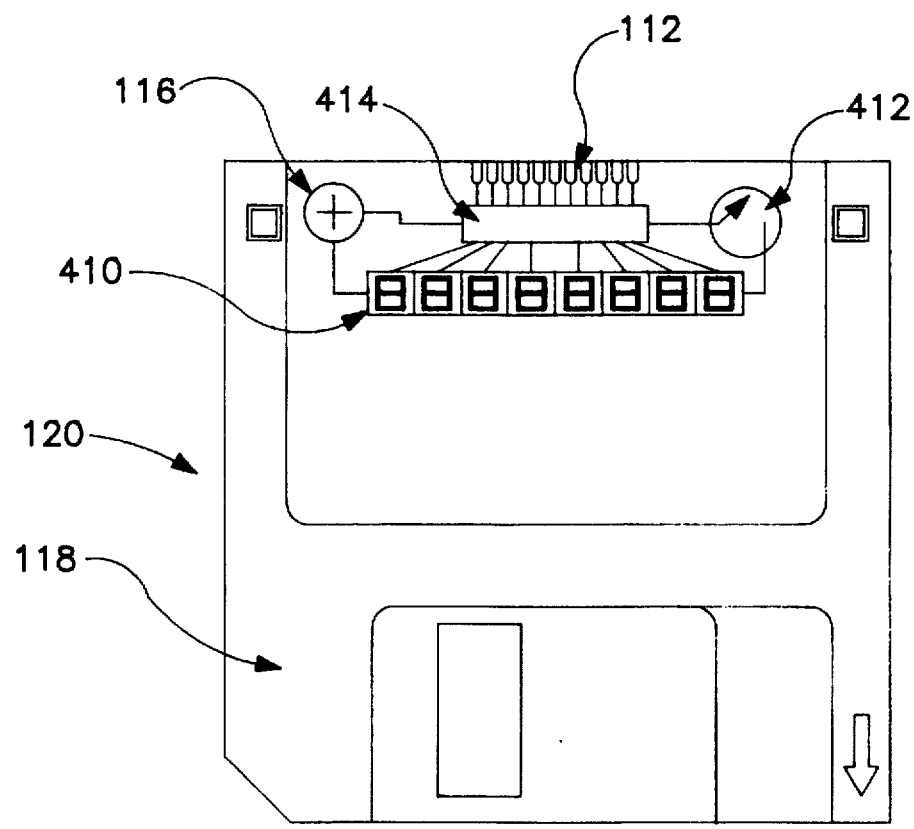
FIG. 4A illustrates a second exemplary embodiment of a floppy disk modified in accordance with the present invention.

FIG. 4A illustrates a second exemplary embodiment of a floppy disk modified in accordance with the present invention. The second embodiment is similar to the first embodiment, however, as seen in FIG. 4A, only a single row 410 of LCDs is used in the second embodiment. Like the first embodiment, secured to the floppy disk housing 118 is a disk terminal strip 112, memory means 414, and a battery 116. This embodiment also includes a switch 412 to operate in conjunction with the memory means 414 such that, although the memory means 414 may be storing many filenames, only one filename at a time is displayed. By activating switch 412, which effectively increments an addressing counter within memory means 414, the address of a memory within memory means 414 is advanced to a next storage location and a new filename is displayed.

Figure 4B:
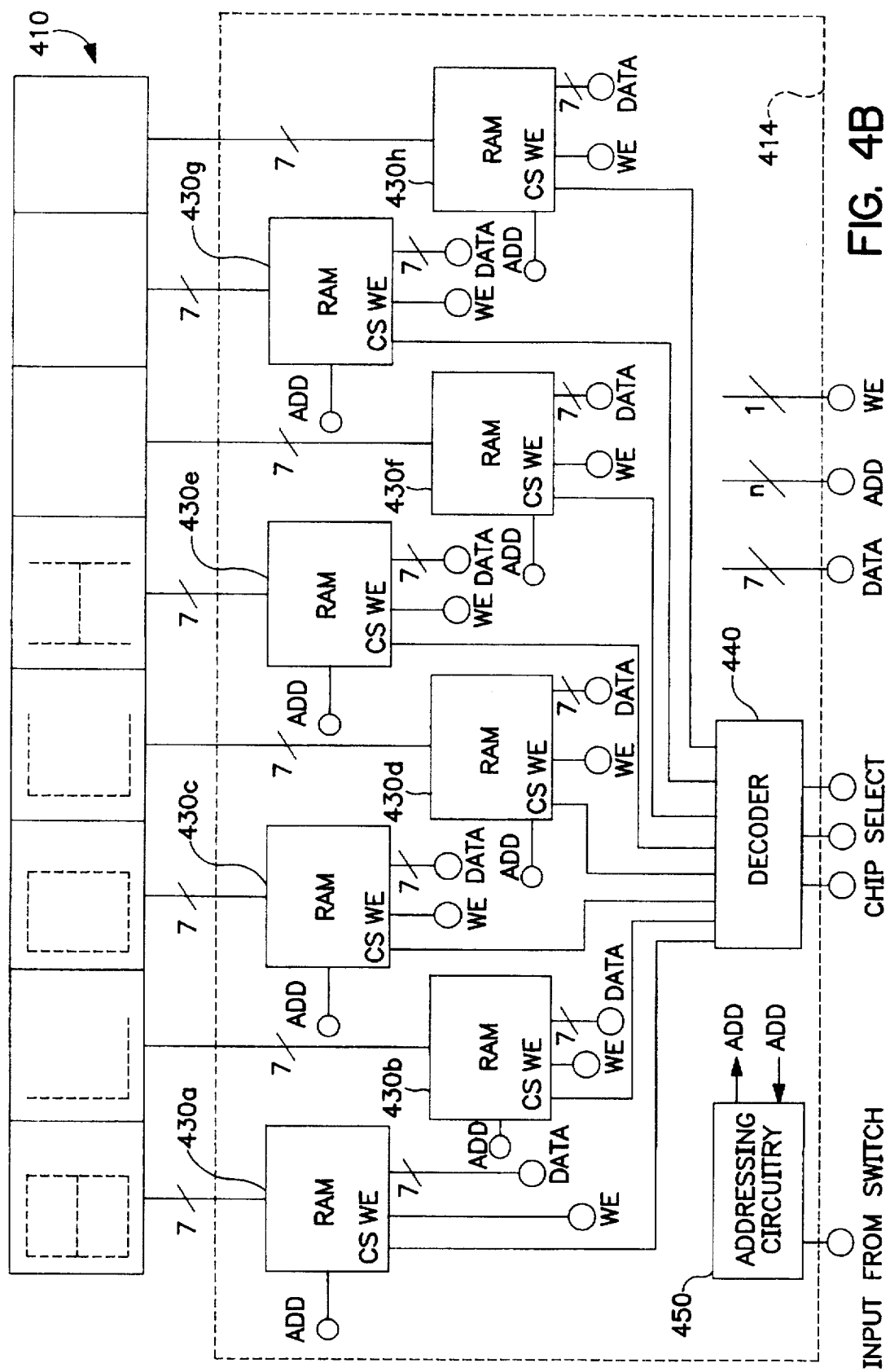
FIG. 4B illustrates an exemplary embodiment of a memory suitable for use with the present invention as shown in FIG. 4A.

An exemplary implementation of memory means 414 is illustrated in FIG. 4B and includes an individual 8-bit RAM for each LCD resulting in eight 8-bit RAMs 430a–430h. In this embodiment, the output data bus for each RAM 430 is connected to a driver circuit for the corresponding LCD display device. Each RAM 430 is designated to store a particular character position for each filename. For example, assuming all filenames are displayed in a left-justified manner, if a file was named BLOCH.DOC, as shown (without the extension) in FIG. 4B, then RAM 430a stores the digital representation of "B" while RAM 430d stores the digital representation of "C". Or, if a file was named HnNBLOCH.EXE, then RAM 430a stores the digital representation of "H" while RAM 430d stores the digital representation of "B". Of course, the present invention can be designed to display only upper case letters or a combination of upper and lower case letters depending on the limitations of the selected display elements (e.g., with a seven segment LCD there is no difference between an upper case "D" and an upper case "O" or between an upper case "A" and an upper case "R").

In addition to RAMs 430a–h, memory means 414 includes a decoder 440 for decoding 3 bits of a chip select control to the eight individual chip selects for the respective RAMs. Thus, in this embodiment of the invention, the filenames are provided one letter at a time to the memories 430.

Furthermore, memory means 414 includes addressing circuitry 450 which includes a counter that increments the addresses of RAMs 430a–h in order to write data into the memory RAMs or to read previously stored data from the RAMs 430a–h for display. Accordingly, as shown in FIG. 4B, number of input connections (e.g. terminals) used in this exemplary embodiment of the present invention depend on the number of signal lines used to convey data and control signals to the disk 120. In the exemplary embodiment shown in FIG. 4B, the control and address information includes chip select information, counter value preset/increment information and a write enable signal. In addition data representing the file names is conveyed using data lines. As will be appreciated by those skilled in the art, the number of individual contacts used in the terminal strips can be minimized by presenting some or all of the information to memory 414 in serial fashion. This information would be converted to bit-parallel data by circuitry (e.g., a microcontroller or shift registers) residing on the data storage device. An exemplary embodiment of this type is described below with reference to FIG. 5B.

The configuration of the second embodiment allows for a number of filenames (or other information, if so desired, such as disk volume or label information) to be transferred to and stored in memory means 414 which is limited only by the size of the RAMs in memory means 414. Again, switch 412 is coupled to counter 450, so that a user could scroll through the stored information contained in the memory means 414 and have that information displayed on the single line LCD display 410.

Of course, memory means 414 could be more complex in design using, for example, a microcontroller, several memories, registers and miscellaneous other circuitry to allow the display to be customized so to list files chronologically, by file extension, alphabetically, hierarchically by subdirectories or other user determined criteria. An example of this type of configuration is shown in FIG. 5B.

There are many advantages to the second embodiment. First, a smaller LCD array is used which is less costly and simpler to produce. The smaller liquid crystal display 410 also has fewer segments to power, therefore, requiring less power to operate. Second, a larger quantity of data can be stored and displayed (dependent upon the memory capacity of the RAMs used), not limited to the physical number of lines and columns available in a particular LCD display. Of course, the second embodiment, shown in FIG. 4A, could be modified to include more than one line of LCDs such that blocks or groups of filenames could be displayed at a time also allowing for scrolling or paging. However, such a modification, as will be appreciated by those skilled in the art, may cause changes to the design of memory 414 shown in FIG. 4B, for example, to include more groups of RAMs or more addressing/control circuitry.

Figure 5A:
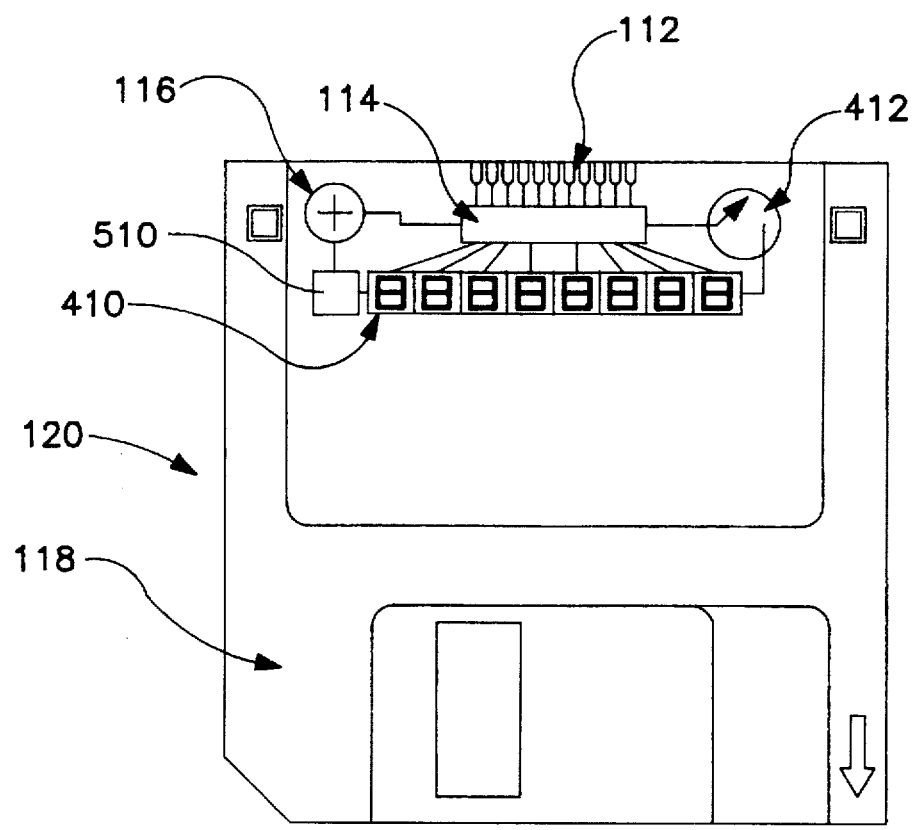
FIG. 5A illustrates a third exemplary embodiment, similar to the embodiment shown in FIG. 4A, but further including optional features such as an ON/OFF switch and a timer for deenergizing the liquid crystal display.
Figure 5B:
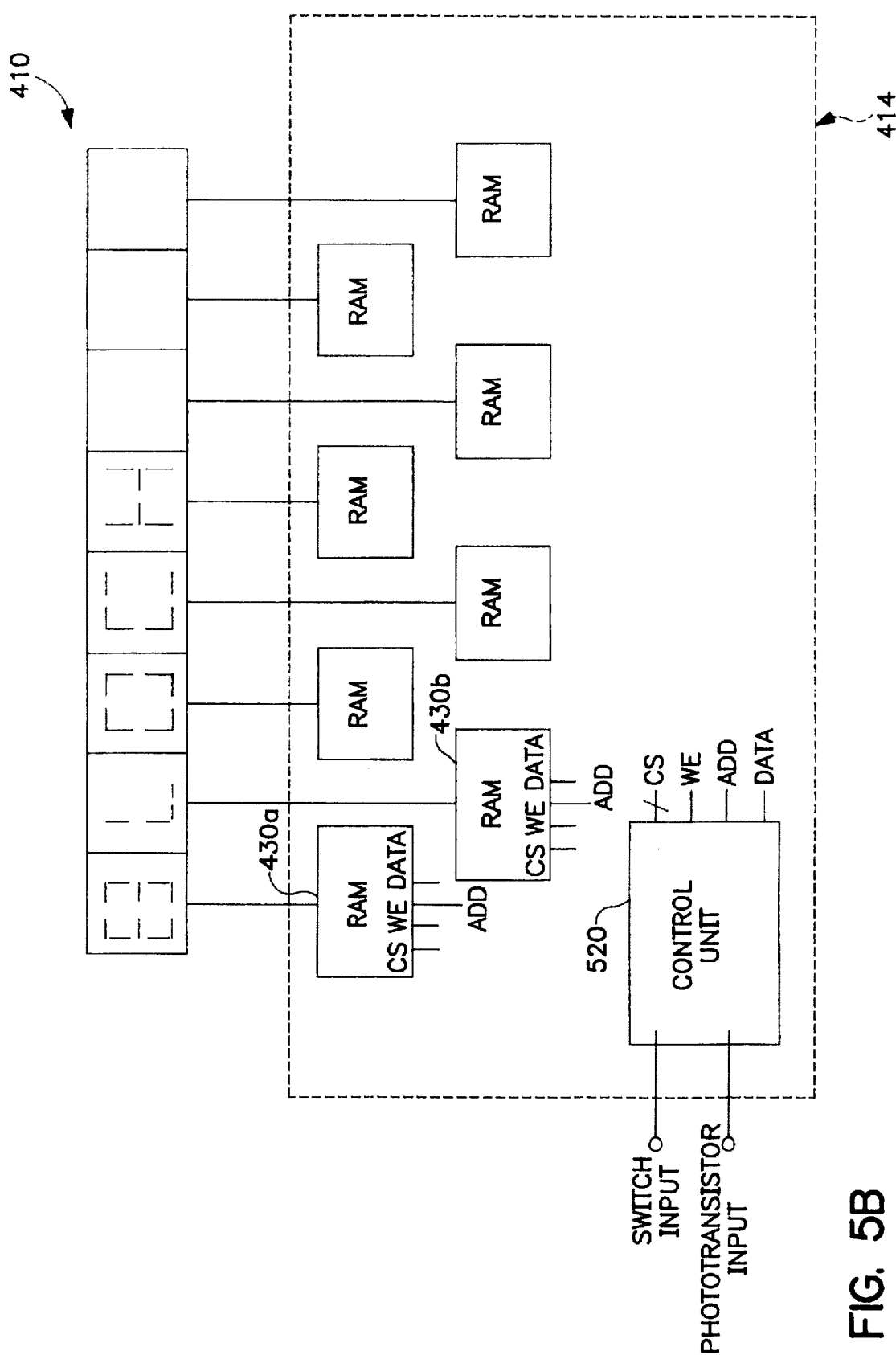
FIG. 5B illustrates an exemplary embodiment of the memory employing a microcontroller suitable for use with the present invention shown in FIG. 5A.

In addition to the features described above for the second exemplary embodiment of the present invention, FIG. 5A illustrates a third exemplary embodiment of the present invention including optional features such as an ON/OFF switch and a timer for deenergizing the liquid crystal display. The embodiment of FIG. 5A includes the same features as those in FIG. 4A; however, in addition, an ON/OFF switch, included in block 510, is used to deenergize the LCD display 410 when it is not being used. This feature extends the life of the battery 116. The ON/OFF switch also reenergizes the liquid crystal display when viewing the contents is desired. The ON/OFF switch may be, for example, a conventional momentary contact push-button switch or it may be an electronic switch having a photosensitive element which are coupled to circuitry which only provides power to the LCD display 410 from the battery 116 for a predetermined time after the push-button is pressed or when the photosensitive element is exposed to a sufficient amount of light (i.e., not when inserted in a drive or packaged in an opaque plastic case). As shown, the ON/OFF switch, in this embodiment, only cuts power to the LCD display 410 and not to the memory 414 which may need power to maintain the contents of the memory 414.

Furthermore, another feature optionally incorporated into the third embodiment is a timer. The timer (not shown) may also be built into circuit 510 for working with or instead of the ON/OFF switch to deenergize the liquid crystal display after a predetermined period of time. This timer may be, for example, a conventional digital or analog one-shot device which is activated by the switch 412 and then deactivated after a predetermined time interval. The ON/OFF switch, if adapted to work with the timer, would reenergize the LCD display when the user wants to view the contents of the storage device.

The previously described embodiments concern circuitry that allows the names of files which are being copied to a data storage device (i.e., floppy disk, laser disk, tape storage devices, etc.) to be selectively copied to a memory internal to the storage device and then displayed from the memory. In the exemplary embodiment of the present invention, the display mechanism is an integral part of the data storage device.

FIG. 5B illustrates an exemplary embodiment of the memory suitable for use with the present invention as shown in FIG. 5A. The embodiment of memory means 414, similar to that shown in FIG. 4B, includes a bank of RAMs 430 for storing the digital representation of the filenames to be displayed. In this embodiment, however, a control unit 520 is employed to received a converted optical input signal from a phototransistor (not shown). In this way, the control unit 520 receives the directory data (e.g., data and addresses) in a serial manner, converts it to a parallel form and delivers the information along with control signals (e.g., chip selects, write enables, etc.) to the appropriate memories. By using a more complicated control unit, including serial-to-parallel conversion, the number of data transfer points on the floppy disk can be minimized, whether the data transfer is via an non-contact optical interface or a contact electrical interface.

Figure 5C:
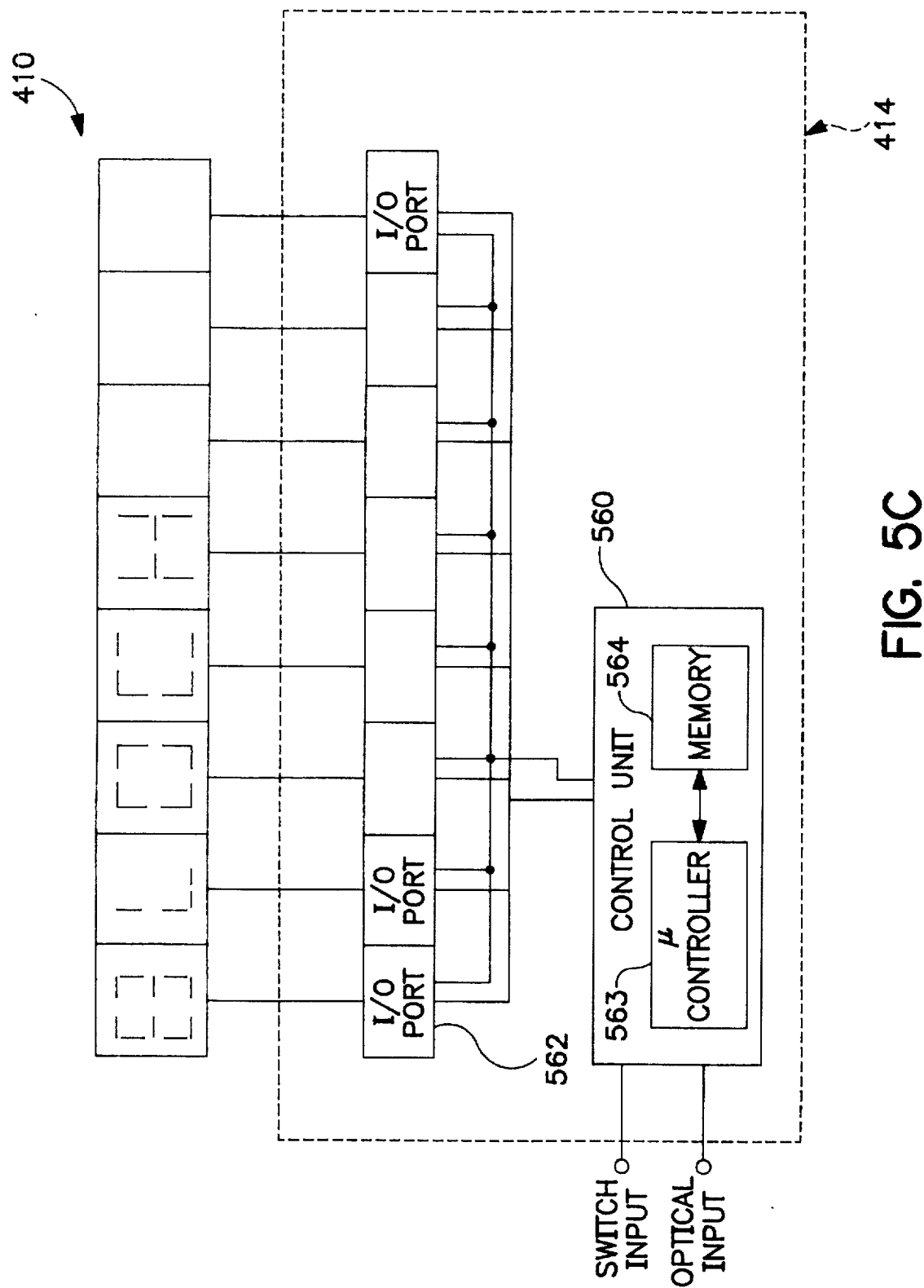
FIG. 5C illustrates another exemplary embodiment of the memory employing a microcontroller suitable for use with the present invention as shown in FIG. 5A.

FIG. 5C illustrates another exemplary embodiment of the memory suitable for use with the present invention as shown in FIG. 5A. The embodiment of memory 114, similar to that shown in FIG. 5B, includes a control unit 560 which includes a microcontroller 563 and an internal memory 564 for storing the digital representation of the filenames to be displayed. In this embodiment, however, a bank of RAMs is not used, rather a group of I/O ports 562 are employed using a memory mapping scheme which allows microcontroller 563 to read data from memory 564 and, repeatedly write the information to the I/O ports 562. Ideally, microcontroller 563 is designed to read and deliver the data to the LCD drivers without creating a flicker effect, however, some flicker may occur and may be tolerable. In this way, the control unit 560 receives the directory data (e.g., data and addresses) in a serial manner, converts it to parallel and stores the information in the internal memory. When appropriate, microcontroller 563 reads the data and provides it to the I/O ports 562 which, in turn, deliver the data to the LCD drivers. Again, by using a more complicated control unit, including serial-to-parallel conversion, the number of data transfer points on the floppy disk can be minimized, whether the data transfer is via an non-contact optical interface or a contact electrical interface.

It should be noted that in the embodiments illustrated in FIGS. 5B and 5C, the respective control units receive an input signal from switch 412 for the purpose of scrolling through the stored filenames.

Figure 5D:
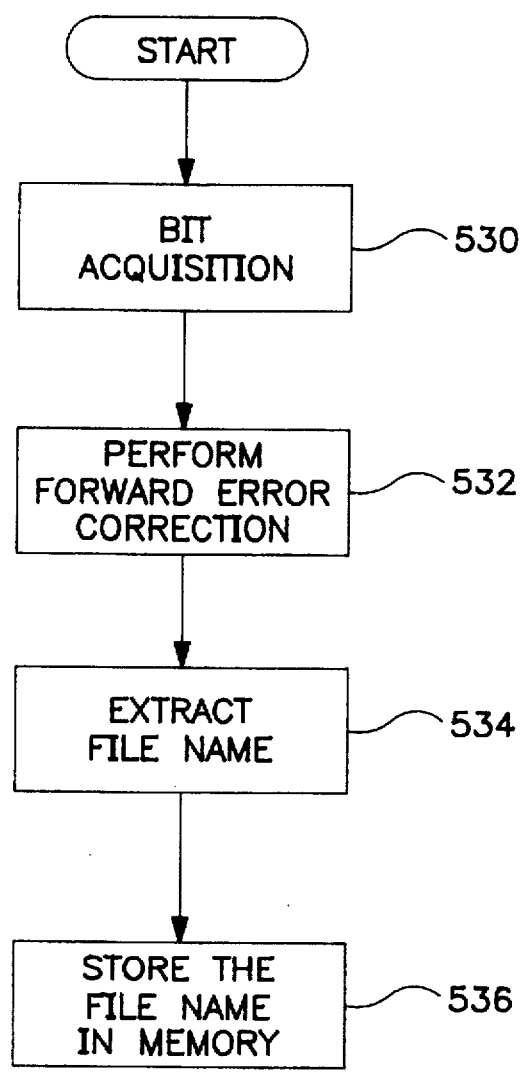
FIG. 5D shows a flowchart diagram of exemplary steps executed by the microcontroller shown in FIG. 5B.

FIG. 5D shows a high-level flowchart diagram of exemplary steps executed by the microcontroller shown in FIG. 5B or 5C. In this exemplary embodiment of the invention, the data are encoded as state changes using, for example, a non-return to zero (NRZ) code which is augmented with forward error correction (FEC) bits. The data are provided to the storage device as a series of fixed-length values, separated by intervals in which no data are transferred. The bit-serial signal conveying the data values changes state at a maximum predetermined rate. As shown, the control unit acquires the bits in a serial manner, at step 530. This step may, for example, cause the imbedded control unit 520 to sample the data signal at a rate much higher than the maximum signal change rate and require a predetermined number of samples at a new level before recognizing a state change. This step also recognizes the boundaries between the fixed-length values and converts the serial NRZ encoded data into a parallel bit stream.

At step 532, the control unit performs forward error correction decoding, then, at step 534, the control unit extracts and formats the filename and address data and any command data. Finally, at step 536, the filename data is stored in memory which may be the bank of RAMs in FIG. 5B or the internal memory of FIG. 5C.

Figure 5E:
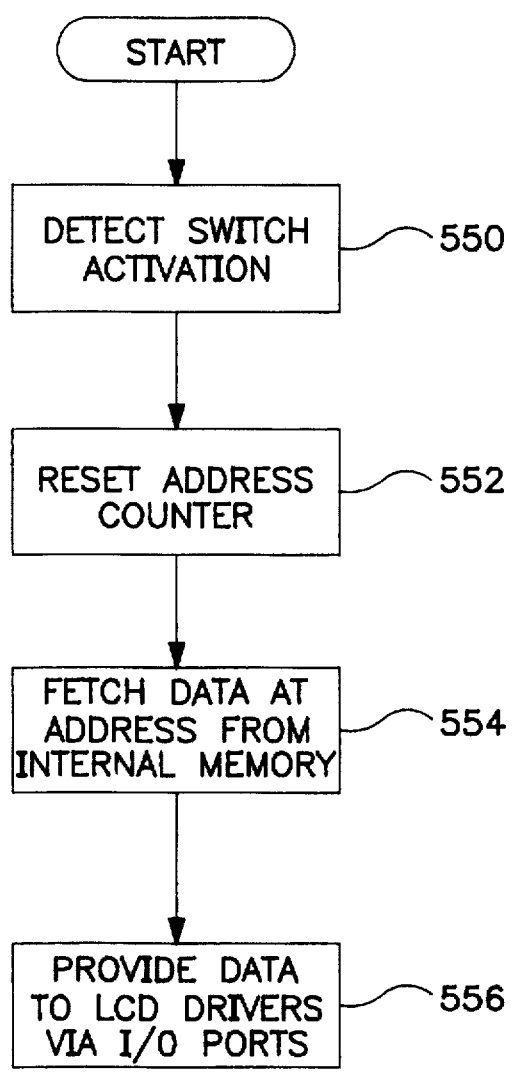
FIG. 5E hows a flowchart diagram of exemplary steps executed in order to read data from the individual memories shown in FIG. 5B.

FIG. 5E shows a high-level flowchart diagram of exemplary steps executed by the control unit to read data from the memory of the control unit shown in FIG. 5C. Initially, for example, after a time out or deenergization, the control unit remains idle until it detects a switch activation, step 550. Upon detection, the control unit resets an address counter, step 552, which permits each successive switch activation to increment the counter. At step 554, the data corresponding to the addresses provided by the counter is fetched from the internal memory and, at step 556, the filename data is provided to LCD Drivers via the memory mapped I/O ports in a repetitive manner (i.e., continuously looping through all I/O ports).

Figure 6A:
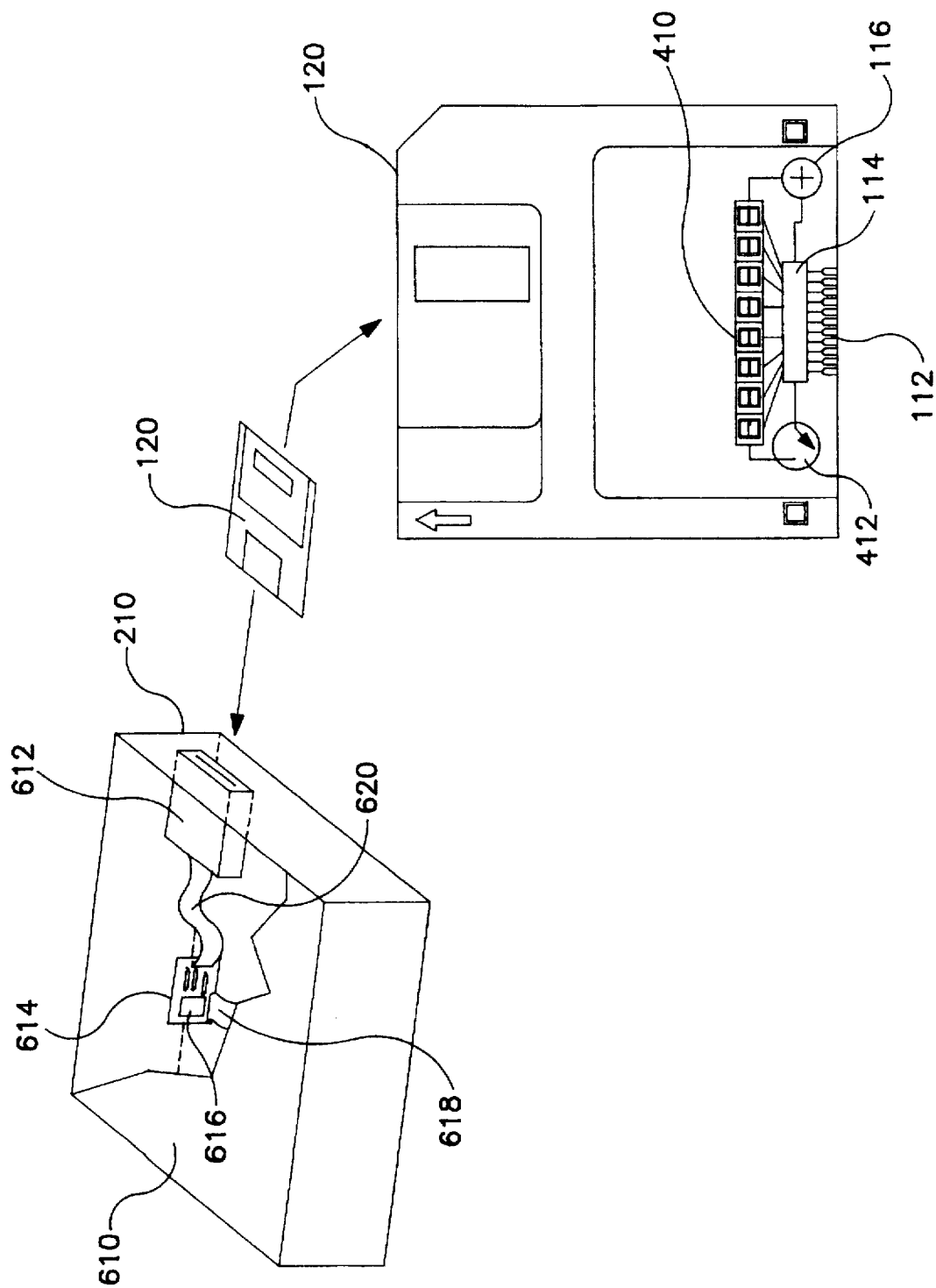
FIG. 6A illustrates a first exemplary embodiment of the circuitry added to a conventional computer for providing the modified disk drive shown in FIGS. 2A and 2B.

FIG. 6A generally illustrates an exemplary embodiment of circuitry added to a conventional computer, suitable for use with the present invention, which provides the directory data to the modified disk drive shown in FIGS. 2A and 2B. As shown, a computer 610 containing a disk drive 612, is modified to further include a circuit board 614 having a microprocessor 616, memory and various other circuit components. The circuit board 614 can reside in the computer 610, as shown in FIG. 6, or exist on a custom or semi-custom card installed in an expansion slot in the computer 610 (as described with reference to FIGS. 7A and 7B) or be integral to the disk drive 612 (as described with reference to FIGS. 8A and 8B) or reside on the data storage device itself.

Continuing with FIG. 6A, circuit board 614 is attached, via cable 618, to an appropriate computer data source. Generally speaking, the appropriate computer data source is some accessible location within computer 610 where storage device access information can be monitored and accessed. An example of an appropriate computer data source may be an off-the-shelf or semi-custom card installed in an expansion slot in the computer 610 or coupled to parallel or serial data ports. This card may be, for example, a conventional floppy disk controller which converts commands passed via the system bus into commands for the floppy disk drive. As described below, this card may also include circuitry which recognizes the filename data and the addresses on the disk into which it is to be written and provide these data and address values as an output signal.

Circuit board 614 is also attached, via cable 620, to drive terminal strip 212 so to deliver the appropriate filename data, via disk terminal strip 112, to the circuitry residing on a floppy disk modified in accordance with the present invention.

It should be noted that disk terminal strip 112 and drive terminal strip 212 are but one way of providing a data transfer interface from the computer/disk drive to the floppy disk. As the desired result is to get the filename data transferred from some location within computer 610 to the display mechanism on the floppy disk, other suitable data transfer interfaces are also contemplated such as other types of physical contacts or non-contact components (e.g., an optical coupler including an infrared light emitting diode (IR-LED) transmitter (not shown) and a phototransistor (not shown) receiver). Furthermore, cables 618 and 620, may be located internal or external to computer 610. Using these methods, the invention may be adapted for use on an existing disk drive.

Continuing with FIG. 6A, it is circuit board 614 which provides the functionality of monitoring access by the computer to the data storage device and, upon detecting an access to the directory area on the storage device, extracting the directory information and providing it, along with appropriate control information (e.g., write enables, chip selects, etc.), and converting the extracted information into a signal which is applied to terminal strip 212. Generally, the functions provided circuit board 614 will be referred to as LCD BIOS.

FIG. 6B shows a flowchart diagram of the exemplary steps executed to perform the LCD BIOS. As shown, the LCD BIOS continually monitors, at step 650, an input data stream representing communications between the computer 610 and the disk drive 612. In the exemplary embodiment, the monitored communications are disk drive commands provided by the floppy disk controller. Then, at step 652, the LCD BIOS detects an access by the computer to a reserved directory area on the storage device which is indicative of writing/deleting filename information. For example, because in MS-DOS systems segment 0 on floppy disks is generally used to store directory information, the LCD BIOS could monitor the data stream provided by the floppy disk controller for any accesses having an address in segment 0. Generally, it is important to monitor writes to segment 0 for updating the filename data stored by the present invention; however, it is also contemplated that a read of segment 0 (i.e., the result of a directory command executed by the personal computer) would be monitored for updating, comparison or refresh purposes.

Continuing with FIG. 6B, upon detecting this activity, at step 654, the LCD BIOS extracts the appropriate information from the data stream, for example, the filename, file extension, address the directory of the storage device, time/date of creation and any other relevant associated information. Having this information, the LCD BIOS, as indicated at step 656, can optionally perform some processing such as 1) filtering filenames with respect to their extensions (e.g., save only files with *.doc extension), 2) organizing filename information with respect to the time/date of creation or position in a directory hierarchy, etc. At step 658, the information, possibly processed, as well as the appropriate control information (e.g. forward error correction code bits), is prepared for transmission such as being properly placed in an outgoing buffer. Finally, at step 660, the filename information and control information are transmitted to a data transfer interface which, in the exemplary embodiment, includes drive terminal strip 212. Once initiated, the LCD BIOS process continues to execute until otherwise disabled by a user by turning off the computer or specifically disabling the process by a software interface.

Figure 7A:
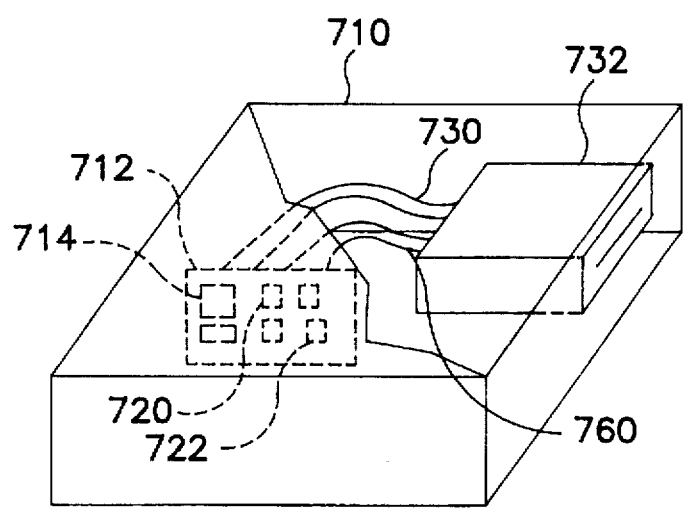
FIGS. 7A and 7B illustrate a second exemplary embodiment of the circuitry added to a conventional computer for providing the modified disk drive shown in FIGS. 2A and 2B.
Figure 7B:
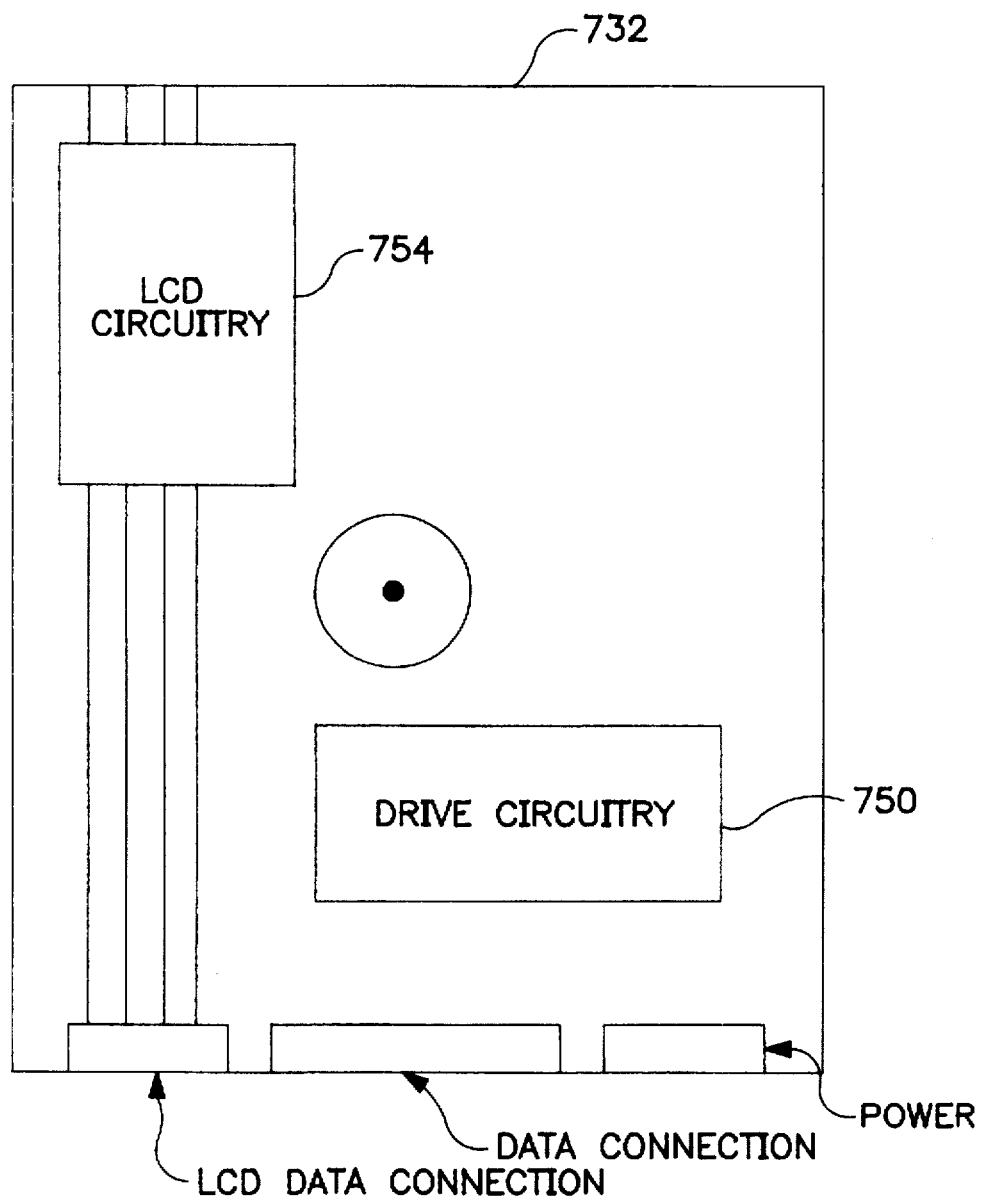

As mentioned above, the location of the LCD BIOS is only important to the extent that it does not interfere with other computer operations and it has access to the data stream carrying communications between the computer and the disk drive. FIG. 6A generally depicts a circuit board 614, having the LCD BIOS functionality, as located somewhere in the computer 610. FIGS. 7A and 7B show one specific embodiment where the LCD BIOS are located on a semi-custom card for installation in an expansion slot of the computer 610. And, FIGS. 8A and 8B show another specific embodiment where the LCD BIOS located directly on the disk drive 612.

FIGS. 7A and 7B illustrate a second exemplary embodiment of the circuitry added to a conventional computer for providing the modified disk drive shown in FIGS. 2A and 2B. FIG. 7A, similar to FIG. 6A, shows a cut-away view of a computer 710 suitable for use with the present invention. As shown in FIG. 7A, a semi-custom card 712 is installed in the expansion slot of the computer. The semi-custom card is a combination of existing floppy drive control circuitry 714 and the LCD BIOS circuitry 720 and 722. It should be noted that older generations of computers were equipped with a floppy drive controller as an expansion slot card. Newer generations (i.e., 386 to present) have floppy drive controllers embedded in the main system board. This embodiment is applicable to either generation as either an existing floppy drive controller card can be modified or the embedded floppy drive controller can be disabled and a new floppy drive controller card can be installed.

Continuing with FIG. 7A, generally a floppy drive controller card has only one ribbon cable 730 extending to the disk drive 732. This cable 730 carries the directory information to the drive circuitry 750 which is attached to the underside of disk drive 732 shown in FIG. 7B. For the semi-custom floppy controller, however, the LCD BIOS 720 resides on the floppy controller card 712 thus two ribbon cables are used: one for normal disk drive communications 730 and the other 760 for delivering filename information from the LCD BIOS 720 to the drive terminal strip 212. In this embodiment, a hardware/software implementation of the LCD BIOS resides on the floppy controller card, accesses the data stream (e.g., through system bus taps on the card) and performs the process illustrated in FIG. 6B. The transmitted information is delivered via the second ribbon cable 760 to the disk drive 732 and, in turn, to the drive terminal strip 212 or optical coupler. If additional processing or buffering is desired, additional LCD circuitry 754 could be added to the disk drive 732. By coupling the second ribbon cable 760 through the housing of the computer 710 to the front of the disk drive 732, this embodiment may be used to adapt an existing disk drive to transfer directory data to a diskette such as is shown in FIGS. 1, 4a and 5a.

Figure 8A:
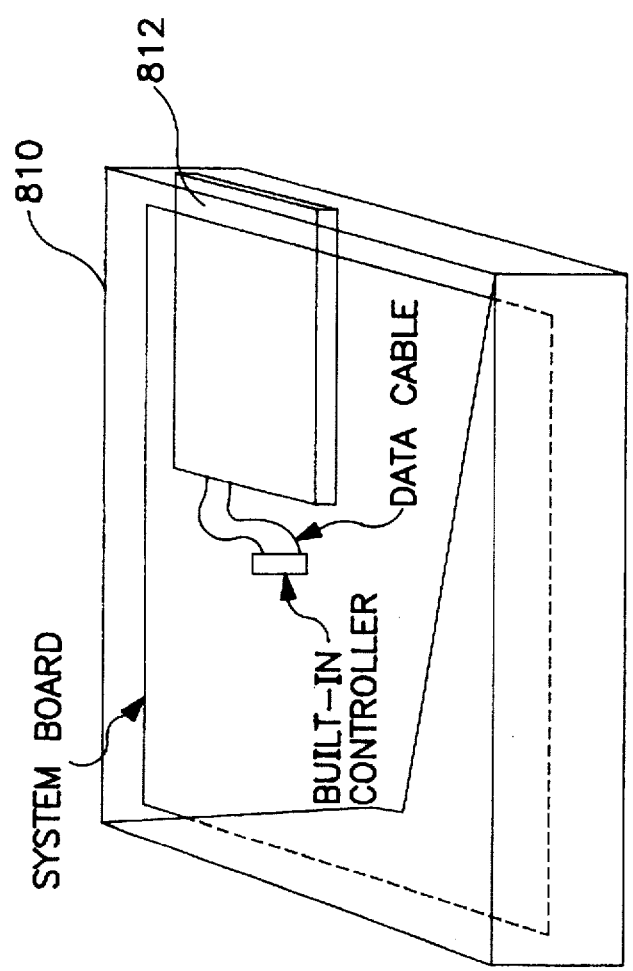
FIGS. 8A and 8B illustrate a third exemplary embodiment of the circuitry added to a conventional computer for providing the modified disk drive shown in FIGS. 2A and 2B.
Figure 8B:
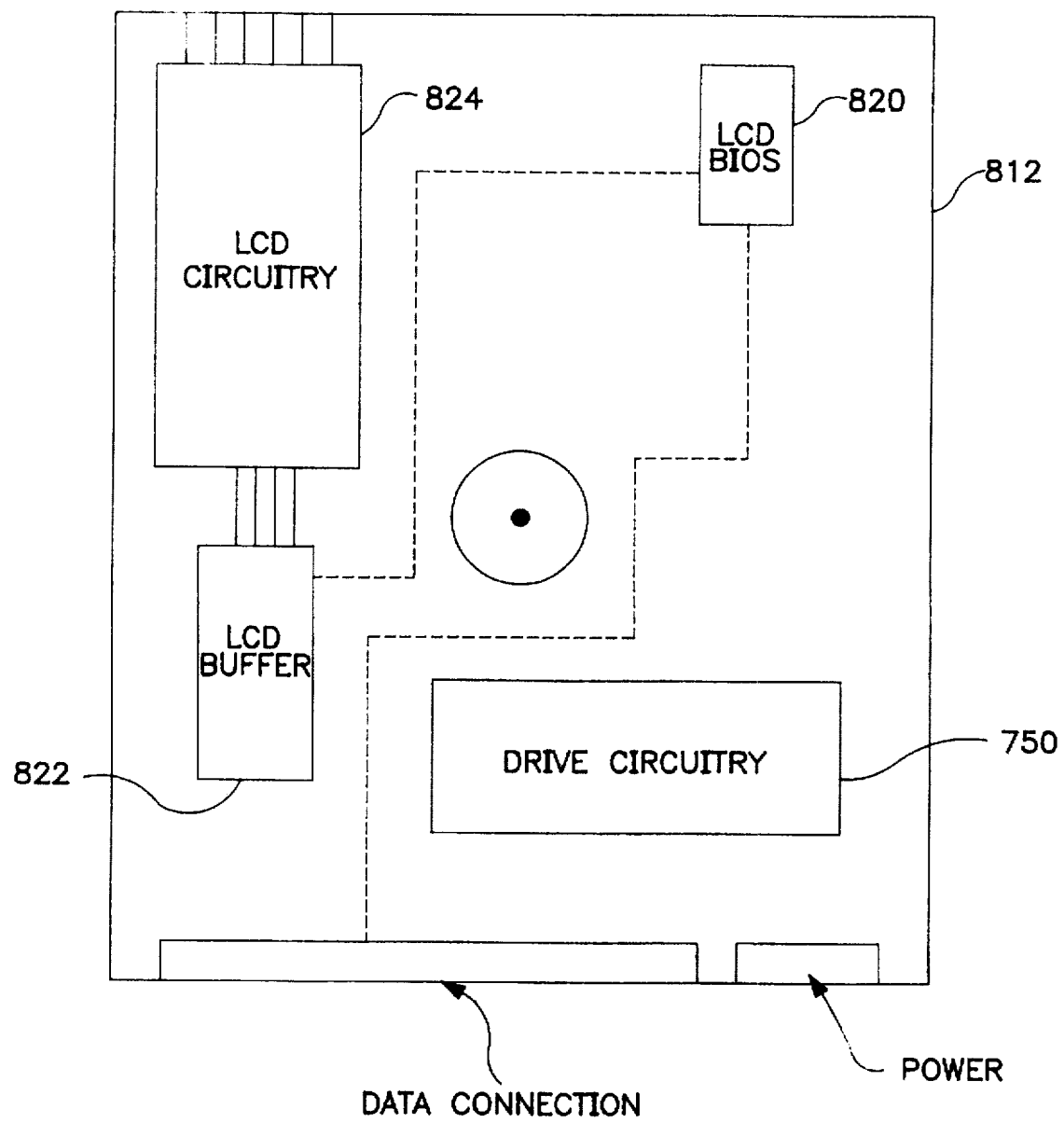

FIGS. 8A and 8B illustrate a third exemplary embodiment of the circuitry added to a conventional computer for providing the modified disk drive shown in FIGS. 2A and 2B. FIG. 8A shows a cut-away view of a computer 810 suitable for use with the present in invention. Unlike the embodiment of FIG. 7A, the embodiment of FIG. 8A allows the embedded floppy drive controller to remain enabled. In this embodiment, however, the LCD BIOS 820 and other related circuitry 822 and 824 reside directly on the disk drive 812. The LCD BIOS 820 taps the data connection (as shown in dotted lines), either internal or external to the disk drive housing, arriving at the disk drive in order to monitor communications. In turn, upon performing its appropriate functions, LCD BIOS 820 delivers the file name and address information to an LCD Buffer 822 and optional LCD circuitry 824. By placing the drive electronics on an adhesive-backed circuit board and using external connections, an existing disk drive may be adapted to be able to store directory data into the memory of one of the diskettes shown in FIGS. 1, 4a and 5a.

Figure 9:
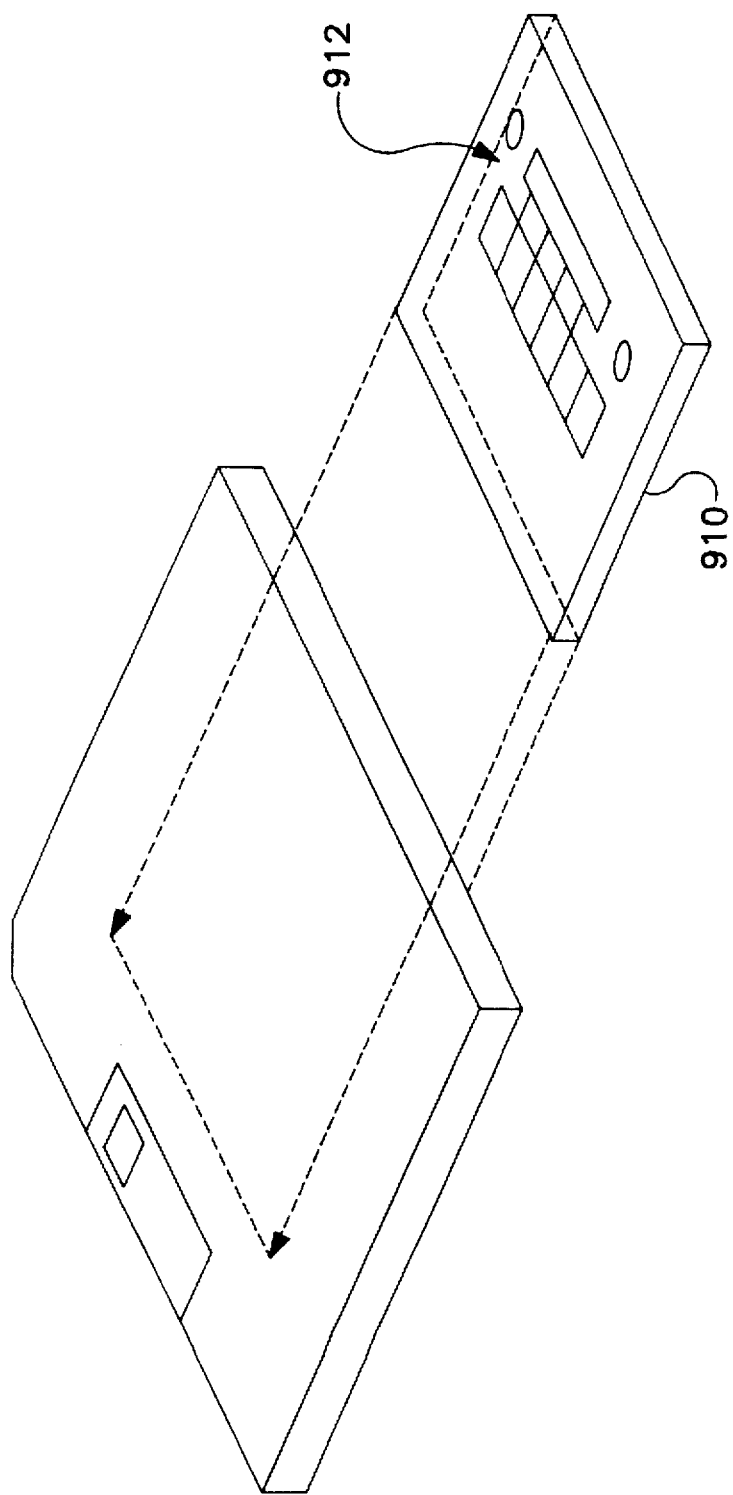
FIG. 9 illustrates an exemplary clip means for use with the present invention.

It should be noted that, although the above embodiments have been described in terms of the programmable, dynamic display mechanism being secured to the housing of a data storage device, it is also contemplated that display mechanism could be mounted on a clip-like device (shown in FIG. 9) or on an adhesive-backed device, constructed of metal, plastic or the like, and affixed to a conventional data storage device. As noted, an illustration of a clip means 910 having the display mechanism 912 mounted thereon is illustrated in FIG. 9. This type of embodiment allows any conventional storage device to be equipped with a programmable, dynamic display mechanism. Obviously, the dimensions of the clip means 910, including the mounted display mechanism 912, are such that the device can be properly inserted/ejected to/from an appropriate data reader (e.g., disk drive).

Although the invention is illustrated and described herein as embodied in a method and apparatus for storing and displaying names of files, contained on a disk, external to that disk, the invention is not intended to be limited to the details shown. Rather, various modifications may be made in the details within the scope and range of equivalents of the claims and without departing from the spirit of the invention.

What is claimed:

1. An apparatus for visually displaying information indicative of data stored on a nonvolatile storage medium of a secondary data storage device, wherein the data stored on the nonvolatile storage medium is accessed only via an external data access device, said apparatus for displaying the information when the secondary data storage device is not coupled to the external data access device, the apparatus comprising:

receiving means, mechanically coupled to the secondary data storage device, for receiving, from the external data access device, information indicative of the data stored on the nonvolatile storage medium of the secondary data storage device;

memory means, mechanically coupled to the secondary data storage device and coupled to the receiving means, for storing the received information and for providing a digital signal representing the information; and display means, mechanically coupled to the secondary data storage device and coupled to the memory means, for receiving and displaying the digital signal representing the information such that information indicative of the data stored on the nonvolatile storage medium can be viewed when the secondary data storage device is not coupled to the external data access device.

2. The apparatus of claim 1, further comprising power means, mechanically coupled to the secondary data storage device, for providing power to the memory means and the display means.

3. The apparatus of claim 2, further comprising means, mechanically coupled to the secondary data storage device, for selectively deenergizing the display means to conserve the power means.

4. The apparatus of claim 1, wherein the memory means also processes the received information.

5. The apparatus of claim 1, wherein the memory means includes a plurality of random access memories (RAMs) for storing the information such that each character of a filename is stored in at least one of the plurality of RAMs.

6. The apparatus of claim 1, wherein the memory means includes at least one random access memory (RAM) in which all of the information is stored.

7. A method for receiving, storing and visually displaying information indicative of data stored on a nonvolatile storage medium of a secondary data storage device, wherein the data stored on the nonvolatile storage medium is accessed only via an external data access device, said method for displaying the information when the secondary data storage device is not coupled to the external data access device, the method comprising the steps of:

receiving, from the external data access device, information indicative of the data stored on the nonvolatile storage medium of the secondary data storage device;

storing, in a memory device on the secondary data storage device, the received information and providing a digital signal representing the information; and displaying, from the memory device on the secondary data storage device, the digital signal representing the information such that information indicative of the data stored on the nonvolatile storage medium can be viewed when the secondary data storage device is not coupled to the external data access device.

8. A system for transmitting, storing and visually displaying information indicative of data stored on a nonvolatile storage medium of a secondary data storage device, wherein the data stored on the nonvolatile storage medium is accessed only via an external data access device, said information to be displayed when the secondary data storage device is not coupled to the external data access device, the system comprising:

a data storage and display device including:

receiving means, mechanically coupled to the secondary data storage device, for receiving, from the external data access device, information indicative of the data stored on the nonvolatile storage medium of the secondary data storage device;

memory means, mechanically coupled to the secondary data storage device and coupled to the receiving means, for storing and decoding the received information and for providing a digital signal representing the information; and display means, mechanically coupled to the secondary data storage device and coupled to the memory means, for receiving and displaying the digital signal representing the information such that information indicative of the data stored on the nonvolatile storage medium can be viewed when the secondary data storage device is not coupled to the external data access device; and data transfer means including:

access means for providing access to communications from the external data access device;

data extraction and conversion means, coupled to the access means, for 1) detecting a communication from the external data access device which communication accesses data in a reserved directory area on the nonvolatile storage medium, 2) converting the detected communication into information indicative of the data stored on the nonvolatile storage medium and 3) communicating the information to a transmitting means; and said transmitting means, being mechanically coupled to the external data access device, for receiving the information from the data extraction and conversion means and transferring the information to the receiving means for purposes of display.

9. The system of claim 8, wherein the access means and data extraction and conversion means reside on a card installed in an expansion slot of a computer.

10. The system of claim 8, wherein the data extraction and conversion means reside on the external data access device.

11. The system of claim 8, wherein the transmitting means is a terminal strip residing on the external data access device.

12. The system of claim 8, further comprising power means, mechanically coupled to the secondary data storage device, for providing power to the memory means and the display means.

13. The system of claim 12, further comprising means, mechanically coupled to the secondary data storage device, for deenergizing the display means after a predetermined time interval to conserve the power means.

14. A system for transmitting information indicative of data stored on a nonvolatile storage medium of a secondary data storage device, wherein the data stored on the nonvolatile storage medium is accessed only via a disk drive means, said information to be displayed when the secondary data storage device is not coupled to the disk drive means, the system comprising;

access means for providing access to communications occurring between a computer means and the disk drive means;

data extraction and conversion means, coupled to the access means, for 1) detecting a communication from the computer means which communication transfers data between the computer means and a reserved directory area on the nonvolatile storage medium, 2) converting the detected communication into information indicative of the data stored on the nonvolatile storage medium and 3) communicating the information to a transmitting means; and said transmitting means, being mechanically coupled to the disk drive means, for receiving the information from the data extraction and conversion means and transferring the information to a receiving means.

15. The system of claim 14, wherein the access means and data extraction and conversion means reside on a card installed in an expansion slot of the computer means.

16. The system of claim 14, wherein the data extraction and conversion means reside on the disk drive means.

17. The system of claim 14, wherein the transmitting means is a terminal strip residing on the disk drive means.

18. A method for transmitting information indicative of data stored on a nonvolatile storage medium of a secondary data storage device, wherein the data stored on the nonvolatile storage medium is accessed only via a disk drive means, said information to be displayed when the secondary data storage device is not coupled to the disk drive means, the method comprising the steps of:

accessing communications occurring between a computer means and the disk drive means;

detecting a communication from the computer means to a reserved directory area on the nonvolatile storage medium, converting the detected communication into information indicative of the data stored on the nonvolatile storage medium; and transmitting the information to a receiving means for purposes of display.

19. An apparatus for visually displaying information indicative of data stored on a floppy disk, wherein the data stored on the floppy disk is accessed only via a disk drive, said apparatus for displaying the information when the floppy disk is not coupled to the disk drive, said floppy disk having a housing, the apparatus comprising:

a terminal strip, mechanically coupled to the housing of the floppy disk, for receiving, from the disk drive, information indicative of files stored on the floppy disk;

logic circuitry, mechanically coupled to the housing of the floppy disk and coupled to the terminal strip, for processing and storing the received information and providing a digital signal representing the information, the logic circuitry including at least one memory, decoding circuitry and addressing circuitry; and a liquid crystal device (LCD) display, mechanically coupled to the housing of the floppy disk and coupled to the logic circuitry, for receiving and displaying the digital signal representing the information such that information indicative of the data stored on the floppy disk can be viewed when the floppy disk is nor coupled to the disk drive.

20. The apparatus according to claim 19, wherein the apparatus including the terminal strip, the logic circuitry and the LCD display are removably secured to the floppy disk.

21. An apparatus for visually displaying information indicative of data stored on a nonvolatile storage medium of a secondary data storage device, wherein the data stored on the nonvolatile storage medium is accessed only via an external data access device, said apparatus for displaying the information when the secondary data storage device is not coupled to the external data access device, the apparatus comprising:

one of a clip means and an adhesive means;

receiving means, mechanically coupled to the one of the clip means and the adhesive means, for receiving, from the external data access device, information indicative of the data stored on the nonvolatile storage medium of the secondary data storage device;

memory means, mechanically coupled to the one of the clip means and the adhesive means and coupled to the receiving means, for storing the received information and for providing a digital signal representing the information; and display means, mechanically coupled to the one of the clip means and the adhesive means and coupled to the memory means, for receiving and displaying the digital signal representing the information such that information indicative of the data stored on the nonvolatile storage medium can be viewed when the secondary data storage device is not coupled to the external data access device, wherein said one of the clip means and the adhesive means is coupled to, and removable from, the secondary data storage device.

* * * * *